United States Patent
Tsubouchi

[19]

[11] Patent Number: 6,065,291
[45] Date of Patent: May 23, 2000

[54] PRESSURE GENERATOR

[75] Inventor: Kaoru Tsubouchi, Toyota, Japan

[73] Assignee: Aisin Seiki Kabushiki Kaisha, Kariya, Japan

[21] Appl. No.: 09/220,455

[22] Filed: Dec. 24, 1998

[30] Foreign Application Priority Data

Dec. 24, 1997 [JP] Japan ..................................... 9-355883

[51] Int. Cl.$^7$ ............................... B60T 13/00; F15B 9/10
[52] U.S. Cl. ....................... 60/547.1; 91/369.2; 91/369.3; 91/376 R
[58] Field of Search ............... 91/369.1, 369.2, 91/369.3, 376 R; 60/547.1

[56] References Cited

U.S. PATENT DOCUMENTS

| | | | |
|---|---|---|---|
| 5,275,265 | 1/1994 | Castel | 91/376 R X |
| 5,845,558 | 12/1998 | Tsbouchi et al. | 91/376 R |
| 5,890,775 | 4/1999 | Tsubouchi et al. | 91/376 R X |

FOREIGN PATENT DOCUMENTS

| | | |
|---|---|---|
| 1-223063 | 9/1989 | Japan . |
| 2-274649 | 8/1990 | Japan . |
| 5-201316 | 8/1990 | Japan . |

Primary Examiner—Hoang Nguyen
Attorney, Agent, or Firm—Burns, Doane, Swecker & Mathis, LLP

[57] ABSTRACT

A pressure generator includes a housing in which is formed at least one pressure chamber, and a power piston disposed inside the housing for advancing and retreating movement with respect to the housing. A moving wall divides the pressure chamber into a front chamber connected to a vacuum source and a rear chamber selectively connected to the vacuum source and the atmosphere, and a valve housing is attached to the moving wall. A valve mechanism disposed inside the valve housing has a vacuum valve for connecting the rear chamber with the front chamber. The valve mechanism also has an atmospheric air valve for connecting the rear chamber with the atmosphere. An output member outputs a thrust force accompanying movement of the moveable wall, and a cylinder body is provided which has a cylinder bore and which is mounted on the front part of the housing. A piston is located in the cylinder bore for advancing and retreating movement. The piston forms a pressure chamber in front of the piston and extends into the housing and is engageable with the output member. An auxiliary movable wall is located in the front chamber for advancing and retreating movement, with the auxiliary movable wall being engageable with the piston. An isolating member forms an auxiliary variable pressure chamber behind the auxiliary moving wall, and a switching device selectively connects the auxiliary variable pressure chamber with the vacuum source or the atmosphere.

14 Claims, 4 Drawing Sheets

6,065,291

PRESSURE GENERATOR

This application corresponds to and claims priority under 35 U.S.C. § 119 with respect to Japanese Application No. 09(1997)-355883 filed on Dec. 24, 1997, the entire content of which is incorporated herein by reference.

FIELD OF THE INVENTION

The present invention generally relates to a pressure generator. More particularly, the present invention pertains to a pressure generator used in a motor vehicle for generating a braking force.

BACKGROUND OF THE INVENTION

A known pressure generator is disclosed in Japanese Patent Laid-Open Publication No. 1(1989)-223063. This pressure generator is installed in a brake apparatus provided with wheel brakes to apply fluid pressure to the wheel brakes which in turn apply a brake force to the wheels.

This known pressure generator includes a master cylinder, a hydraulic pump and a pressure supply device. The master cylinder is provided with a cylindrical body in which is defined a cylinder bore, and a piston which is slidably disposed in the cylinder bore to form a pressure chamber between the front side of the piston and the cylinder body, and with the pressure chamber being connected to the wheel brake. When the brake pedal is operated, the piston is advanced to generate brake pressure which is applied to the wheel brake.

The hydraulic pump draws in and discharges fluid pressure, thus supplying the fluid pressure to the wheel brakes when one or more of the wheels tends to be slipping (spinning) in relation to the road surface. The pressure supply device supplies brake pressure, corresponding to the operation of the hydraulic pump, to the hydraulic pump independently of the master cylinder.

Under a normal brake operation when the brake pedal is operated, brake pressure is generated in the pressure chamber of the master cylinder by the advance of the piston. The brake pressure is applied to the wheel brake to apply a braking force to the wheel. When a condition occurs where the vehicle wheels are slipping (spinning) during acceleration, the hydraulic pump supplies brake pressure to the wheel brakes to prevent the wheels from slipping. At this time, the pressure supply device generates the brake pressure, after supplying brake pressure to the hydraulic pump independently of the master cylinder, so that brake pressure is supplied to the wheel brake smoothly.

However, by virtue of the presence of the pressure supply device, the pressure generator having the construction as described above is undesirably large in size and complex in construction.

In light of the foregoing, a need exists for a pressure generator which is relatively simple in structure and small in size, while at the same time providing an efficient pre-pressurizing mechanism in a brake fluid pressure control apparatus.

SUMMARY OF THE INVENTION

In light of the foregoing, the present invention provides a pressure generator that includes a cylinder body having a cylinder bore, a piston located within the cylinder bore for advancing and retreating movement and forming a pressure chamber in front of the piston, a first moving mechanism for directly abutting the piston and moving the piston, and a second moving mechanism for directly abutting the piston and moving the piston.

According to another aspect of the invention, the pressure generator includes a housing in which is formed at least one pressure chamber, a power piston disposed inside the housing for advancing an retreating movement with respect to the housing which has a moving wall that divides the pressure chamber into a front chamber connected to a vacuum source and a rear chamber selectively connected to the vacuum source and the atmosphere, and a valve housing attached to the moving wall. A valve mechanism is disposed inside the valve housing and has a vacuum valve for connecting the rear chamber with the front chamber in correspondence with movement of the input member. The valve mechanism also has an atmospheric air valve for connecting the rear chamber with the atmosphere in correspondence with movement of the input member. An output member outputs from the pressure generator a thrust force accompanying movement of the moveable wall, and a cylinder body is provided which has a cylinder bore and which is mounted on the front part of the housing. A piston is located in the cylinder bore for advancing and retreating movement. The piston forms a pressure chamber in front of the piston and extends into the housing and is engageable with the output member. An auxiliary movable wall is located in the front chamber for advancing and retreating movement, with the auxiliary movable wall being engageable with the piston. An isolating member forms an auxiliary variable pressure chamber behind the auxiliary moving wall, and a switching device selectively connects the auxiliary variable pressure chamber with the vacuum source or the atmosphere.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
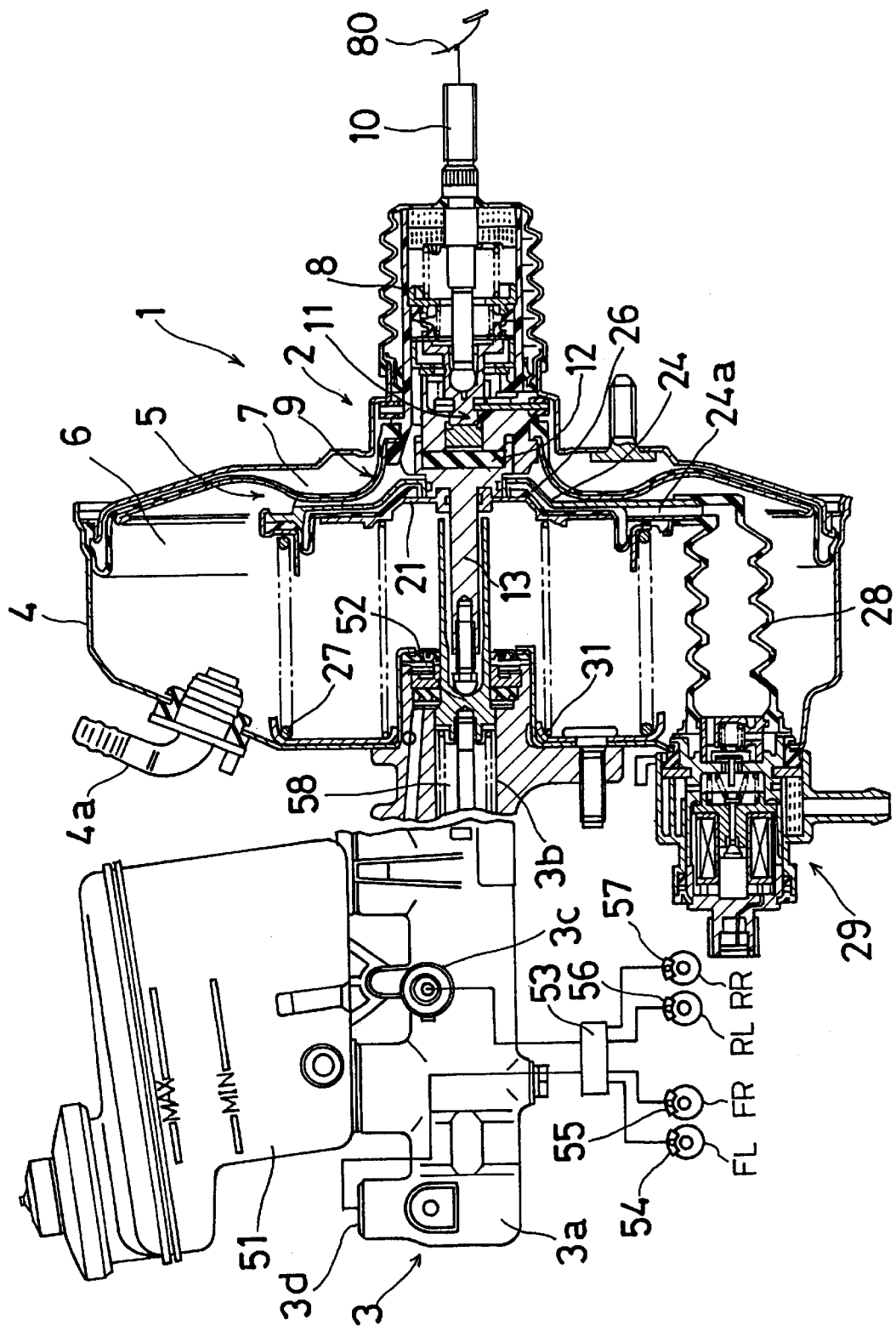
FIG. 1 is a cross-sectional view of the hydraulic pressure generator in accordance with a first preferred embodiment of the present invention.
Figure 2:
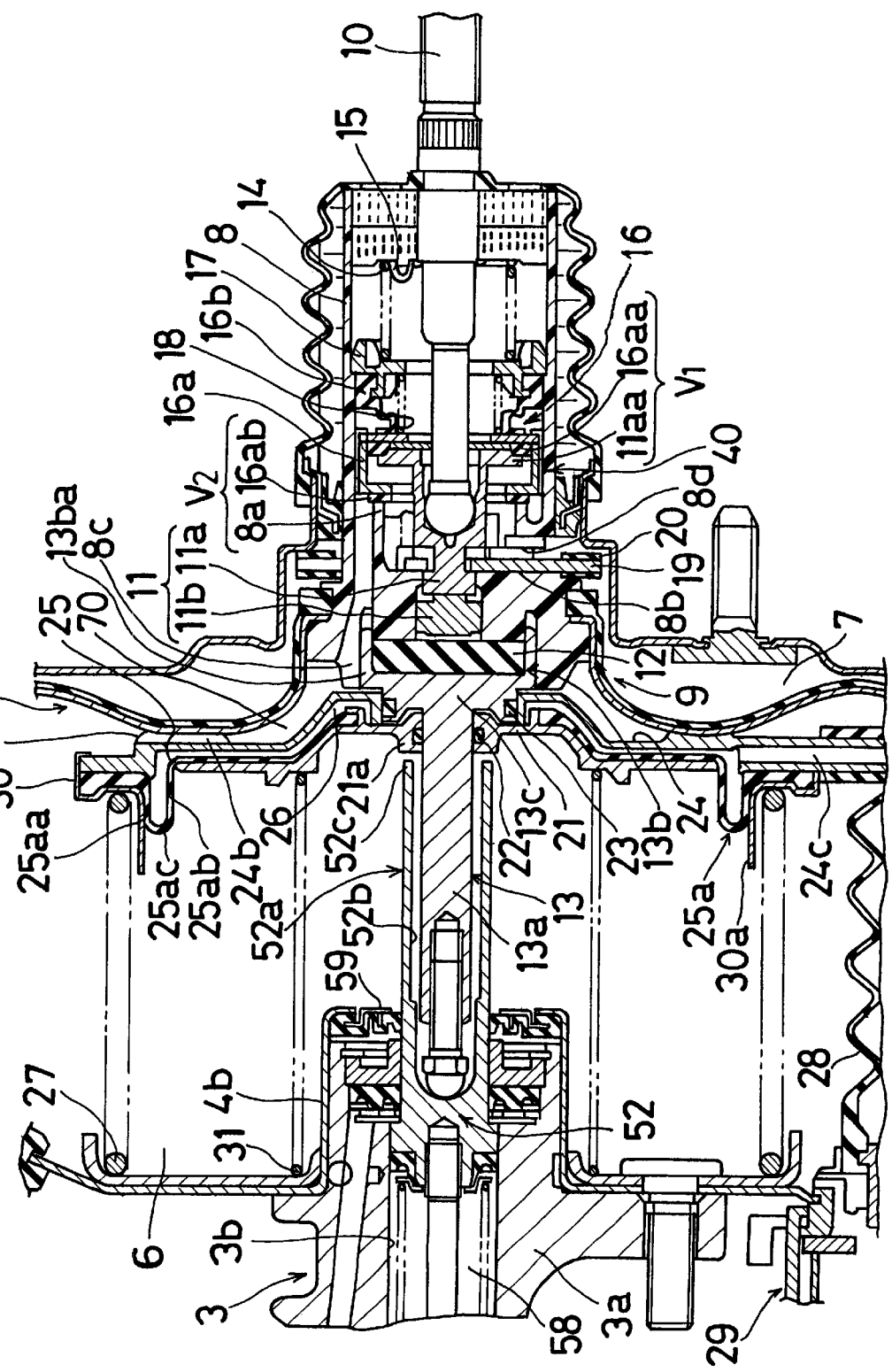
FIG. 2 is an enlarged view of a portion of the hydraulic pressure generator shown in FIG. 1 in the vicinity of the output rod of the vacuum booster.

With reference to the illustrations in FIGS. 1 and 2, the hydraulic pressure generator 1 of the present invention includes a vacuum booster 2 and a master cylinder 3 provided with a reservoir tank 51.

An actuator part 53 for ABS (Anti-Lock Braking system), TRC (Traction Control) and steering brake control is connected by hydraulic piping to the master cylinder 3. Wheel cylinders 54, 55, 56, 57 mounted on vehicle wheels FL, FR, RL, RR, respectively, are connected by hydraulic piping to the actuator part 53.

A movable wall 5 movable in the front-rear direction (i.e., the left-right direction in FIG. 1) is disposed inside a housing 4 of the vacuum booster 2 and possesses an outer periphery that is fixed in an airtight manner to the housing. The movable wall 5 divides the pressure chamber inside the housing 4 in an airtight manner into a front chamber 6 and a rear chamber 7. The front chamber 6 is connected through an inlet 4a to the intake manifold of a vehicle engine (not shown), which serves as a vacuum source, so that the front chamber 6 is held at a negative pressure at all times.

A valve housing 8 made of a resin material is inserted in the housing 4 from the rear and the inner periphery of the movable wall 5 is fixed in an airtight manner to the valve housing 8. The movable wall 5 and the valve housing 8 form a power piston 9 which moves in the front-rear (forward-rearward) direction inside the housing 4.

An input rod 10 is located in the valve housing 8. The rear end of the input rod 10 is connected to a brake operating member 80 of the vehicle which may be in the form of a brake pedal as shown in FIG. 1. The input rod 10 is also connected to a first input member 11a of an input member 11 so that the first input member 11a is movable integrally with the input member 11.

The input member 11 is movably disposed in the valve housing in the front-rear (forward-rearward) direction and includes the first input member 11a and a second input member 11b. As described above, the first input member 11a is connected to the input rod 10 while the second input member 11b abuts upon a reaction disc 12. An output rod 13 abuts against the opposite side of the reaction disc 12 so that the output rod 13 receives and is moved by an input from the reaction disc 12. The output rod 13 in turn moves a piston 52 of the master cylinder 3.

A first retainer 15 receives a return spring 14 and is fixed to the input rod 10. A second retainer 17 supporting the rear end part 16b of a control valve 16 is fixed to the valve housing 8 and receives a spring force from the input rod 10 by way of the first retainer 15 and the return spring 14. The inner periphery of the rear end part 16b of the control valve 16 engages the second retainer 17 and the outer periphery of the control valve 16 forms a seal between with the inner surface of the valve housing 8. The front part of the control valve 16 includes a seal part 16a. A valve spring 18 is interposed between the second retainer 17 and a retainer supporting the seal part 16a of the control valve 16.

By virtue of the construction described above, when the input rod 10 is in a non-operating state, an air valve part 16aa of the seal part 16a of the control valve 16 engages an air valve seat 11aa formed on the rear end of the first input member 11a. When the input rod 10 is in an operating state, a vacuum valve part 16ab of the seal part 16a is able to engage with a vacuum valve seat 8a provided on the valve housing 8. That is, the air valve part 16aa and the air valve seat 11aa constitute an atmospheric air valve $V_1$, and the vacuum valve part 16ab and the vacuum valve seat 8a constitute a vacuum valve $V_2$. In addition, the control valve 16, the air valve seat 11aa of the first input member 11a and the vacuum valve seat 8a of the valve housing 8 constitute a valve mechanism 40.

A key 19 is inserted into a key groove 8b provided in the valve housing 8. In the non-operating state, the key 19 abuts against the housing 4 by way of a damper member 20. A first vacuum passage 8c for connecting the front chamber 6 with the vacuum valve $V_2$ is formed in the valve housing 8. Additionally, an air passage 8d for connecting the rear chamber 7 with the atmospheric air valve $V_1$ is formed in the valve housing 8. A front chamber side opening of the first vacuum passage 8c, which opens into the front chamber 6, is formed in the front end of the valve housing 8, and a rear chamber side opening of the air passage 8d, which opens into the rear chamber 7, is formed in the side face of the valve housing 8.

The output rod 13 has an elongated bar-like shaft part 13a at its front, a cup-shaped part 13b at its rear end, and a base part 13c between the shaft part 13a and the cup-shaped part 13b. The recess defined by the cup-shaped part 13b receives the reaction disc 12. The recess defined by the cup-shaped part 13b also receives the front end of the valve housing 8. The rear end portion of a cylindrical body 3a of the master cylinder 3 is fitted in a liquid-tight manner into a substantially cylindrical recessed part 4b of the housing 4. The recessed part 4b is formed in the middle of the front face of the housing 4 and projects toward the front chamber 6.

The cylindrical body 3a of the master cylinder 3 possesses a cylindrical bore 3b extending in the front-rear direction (i.e., the left-right direction in FIG. 2). A first piston 52 and a second piston are inserted in an opening part and a middle part of the cylindrical bore 3b, respectively and are slidable back and forth. A first pressure chamber 58 is formed inside the cylindrical bore 3b by the first piston 52 and the second piston. A second pressure chamber (not shown) is formed by the second piston and a bottom face of the cylindrical body 3a.

The first piston 52 has an extension part 52a that projects from a rear opening of the cylinder body 3a. The extension part 52a extends through a seal member 59 into the front chamber 6 of the housing 4 and possesses a concavity or hollow portion 52b that opens at the rear end face of the extension part 52a. The shaft part 13a of the output rod 13 is positioned in the hollow portion 52b of the first piston 52, and the front end of the output rod 13 is adapted to abut against a bottom part of the hollow portion 52b.

A substantially annular auxiliary movable wall 21 is located in the front chamber 6. The inner peripheral part 21a of the auxiliary movable wall 21 is slidably fitted in an airtight manner to the shaft part 13a of the output rod 13 by way of a seal member 22. A substantially annular isolating wall 24 is positioned to the rear of the auxiliary movable wall 21. The inner periphery of the isolating wall 24 is fitted in an airtight manner to the base part 13c of the output rod 13 by way of a seal member 23. The front end face of the inner peripheral part 21a of the auxiliary movable wall 21 is adapted to abut upon an opening rim 52c of the hollow portion 52b of the first piston 52. When the auxiliary moving wall 21 is not operating, a predetermined clearance exists between the inner peripheral part 21a of the auxiliary movable wall 21 and the opening rim 52c.

The auxiliary movable wall 21 and the isolating wall 24 are connected in an airtight manner by a seal member 25, with an auxiliary variable pressure chamber 26 being thereby formed between the auxiliary movable wall 21 and the isolating wall 24. The seal member 25 is flexible and has its inner periphery connected in an airtight manner to the auxiliary movable wall 21 and its outer periphery connected in an airtight manner to the outer periphery of the isolating wall 24 by a retainer 30. Thus the auxiliary variable pressure chamber 26 is enclosed in an airtight manner by the output rod 13, the auxiliary movable wall 21, the isolating wall 24 and the seal member 25.

A bend part 25a is located between the inner periphery and the outer periphery of the seal member 25. This bend part 25a opens rearwardly. The bend part 25a is made up of an outer annular portion 25aa projecting in the forward direction, an inner annular portion 25ab projecting in the forward direction on the inner side of and approximately parallel to the outer annular portion 25aa, and a connecting portion 25ac connecting the front end of the outer annular portion 25aa with the front end of the inner annular portion 25ab. The retainer 30 possesses an annular projecting portion 30a extending in the forward direction around the outside of the bend part 25a of the seal member 25.

A return spring 27 is fitted between the retainer 30 and the housing 4. The isolating wall 24 is subjected to a rearward urging force from the housing 4 by the return spring 27 by way of the seal member 25 and the retainer 30. The power piston 9 is also urged rearward by the return spring 27 by way of the seal member 25, the retainer 30, and the isolating wall 24.

A second vacuum passage 70 is formed between the rear face of the isolating wall 24 and the front end face of the power piston 9. An abutting portion 24a is provided on the rear side of the outer periphery of the isolating wall 24. This abutting portion 24a is adapted to abut against the movable wall 5. A connecting passage 24b is formed in the abutting portion 24a. The connecting passage 24b, particularly when the abutting portion 24a is abutting upon the movable wall 5, allows the front chamber 6 and the first vacuum passage 8c to be connected by the second vacuum passage 70.

A return spring 31 is fitted between the front side inner face of the housing 4 and the front face of the auxiliary moving wall 21. The auxiliary moving wall 21 is urged rearwardly by the return spring 31.

As seen in FIG. 1, an air passage 28 is connected in an airtight manner at its rear end to an inlet opening 24c formed in the isolating wall 24. The air passage 28 is thus connected to the auxiliary variable pressure chamber 26. The air passage 28 passes through the front chamber 6 and is connected in an airtight manner at its front end to an electromagnetic valve unit 29, the details of which will be further discussed later. The air passage 28 is formed within a bellows-shaped element that can be extended and compressed in the front-rear direction.

Figure 3:
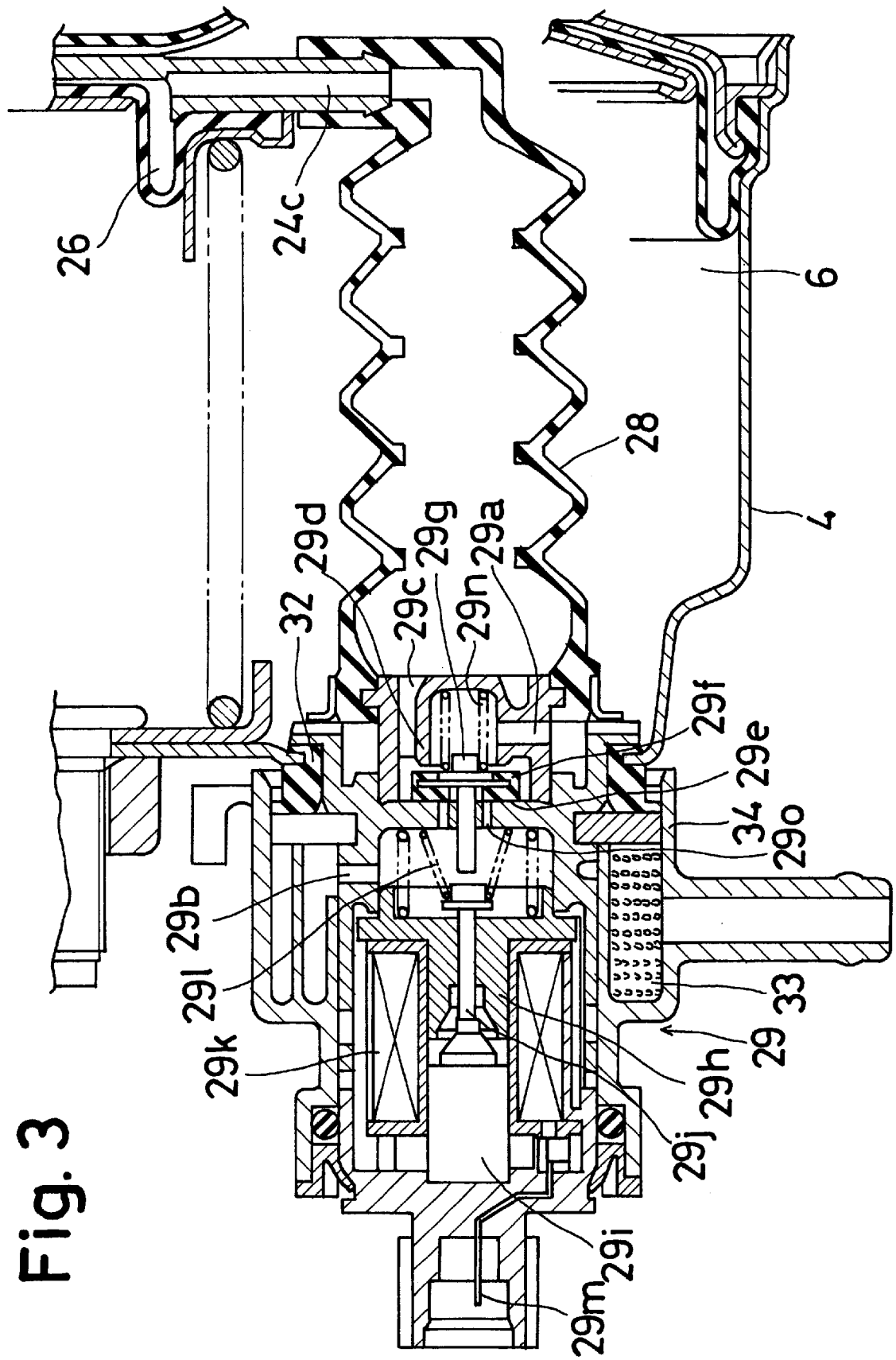
FIG. 3 is an enlarged view of a portion of the hydraulic pressure generator shown in FIG. 1 in the vicinity of the electromagnetic valve unit.

FIG. 3 is an enlarged view of the electromagnetic valve unit 29 shown in FIG. 1. The electromagnetic valve unit 29 serves as a switching means for selectively connecting the auxiliary variable pressure chamber 26 of the vacuum booster 2 to a vacuum source or to the atmosphere. The electromagnetic valve unit 29 is mounted in an airtight manner on the front face of the vacuum booster 2 by way of a seal member 32. Located inside the electromagnetic valve unit 29 is a fixed pressure port 29a communicating with the front chamber 6, an atmospheric air port 29b communicating with an air cleaner 34 for atmospheric air introduction that is provided with a cleaner member 33, a variable pressure port 29c communicating with the air passage 28, a fixed pressure valve seat 29d for connecting and disconnecting the front chamber 6 with the auxiliary variable pressure chamber 26, an atmospheric air valve seat 29e for connecting and disconnecting the auxiliary variable pressure chamber 26 with the atmosphere, a valve part 29g having at an end thereof a valve 29f serving as a valve member, a fixed core 29h, a movable core 29i, a rod part 29j passing through the fixed core 29 and having a front side that is adapted to abut on the moving core 29i, and a solenoid 29k disposed around the fixed core 29h and the movable core 29i, The periphery of the electromagnetic unit 29 has an air cleaner for atmospheric air introduction 34, which forms an atmospheric air inflow passage extending around the periphery of the electromagnetic valve unit 29 to introduce atmospheric air into the air passage 28 through the electromagnetic valve unit 29. The air cleaner for atmospheric air introduction 34 is connected by a tube (not shown) to a space (not shown) inside the vehicle.

A spring 291 is disposed between the rod part 29j and a dividing wall. The spring 291 urges the rod part 29j away from the valve part 29g (i.e., to the left in FIG. 3) and thereby urges the moving core 29i away from the fixed core 29h.

The solenoid 29k is connected by a terminal 29m to a power supply (not shown) of the vehicle, and is supplied with power from this power supply by a controller (not shown) of the vehicle.

The valve part 29g is urged toward the left in FIG. 3 by a spring 29n, and the valve 29f is thereby moved away from the fixed pressure valve seat 29d and made to abut upon the atmospheric air valve seat 29e. In the non-operating state of the electromagnetic valve unit 29 shown in FIG. 3, the rod part 29j and the valve part 29g are not in abutment.

In this state, because the valve 29f is not seated on the fixed pressure valve seat 29d, the auxiliary variable pressure chamber 26 is connected with the front chamber 6, and hence with the vacuum source, by way of the air passage 28, the variable pressure port 29c, the gap between the valve 29f and the fixed pressure valve seat 29d, and the fixed pressure port 29a.

On the other hand, when power is supplied to the solenoid 29k from the power supply by a controller of the vehicle as mentioned above, the solenoid 29k operates to attract the movable core 29i to the fixed core 29h, thus causing the movable core 29i to slide toward the fixed core 29h (i.s., to the right in FIG. 3). The movable core 29i thus pushes the rod part 29j, and the movable core 29i and rod part 29j move integrally to the right in FIG. 3.

The rear end of the rod part 29j thus urged by the moving core 29i then abuts upon the front end of the valve part 29g, and the rod part 29j pushes the valve part 29g towards the rear (i.e., to the right in FIG. 3), whereupon the valve 29f abuts against the fixed pressure valve seat 29d, with the valve 29f being unseated from the atmospheric air valve seat 29e.

As a result, atmospheric air from inside the vehicle is introduced into the auxiliary variable pressure chamber 26 by way of the air passage 28, the variable pressure port 29c, the gap between the valve 29f and the atmospheric air valve seat 29e, a connecting hole 290, the atmospheric air port 29b and the air cleaner for atmospheric air introduction 34.

Located inside the actuator part 53 shown in FIG. 1 is hydraulic piping carrying brake fluid, electromagnetic valves for cutting off the flow of brake fluid in the hydraulic piping, reservoirs for storing brake fluid, a pump unit for pumping brake fluid, and an electronic control unit (ECU) for controlling the electromagnetic valves and the pump unit.

The operation of the hydraulic pressure generator 1 will now be described with reference to the illustrations in FIGS. 1–3 and the graph in FIG. 4 which illustrates the characteristics of the hydraulic pressure generator 1, with the vertical axis showing the output and the horizontal axis showing the input. In an initial state in which a driver is not operating the brake pedal 80 constituting the brake operating member of the vehicle, the isolating wall 24 and the movable wall 5 of the power piston 9 are in abutment due to the urging force of the return spring 27, the air valve part 16aa of the seal part 16a of the control valve 16 is seated on the air valve seat 11aa of the input member 11, and the vacuum valve part 16ab of the seal part 16a is not seated on (i.e., is spaced from) the vacuum valve seat 8a of the valve housing 3. Consequently, the rear chamber 7 is connected with the engine intake manifold of the vehicle (i.e., the vacuum source) by way of the air passage 8d, the gap between the vacuum valve part 16ab and the vacuum valve seat 8a, the first vacuum passage 8c, the second vacuum passage 70, the connecting passage 24b, the front chamber 6 and the inlet 4a. When the brake pedal 80 is operated by a driver, the input rod 10 connected to the brake pedal 80 receives the input and moves forward (i.e., to the left in FIGS. 1 and 2). As a result, the first input member 11a fixed to the input rod 10 and the second input member 11b move forward integrally with input rod 10.

As a result of the movement of the first input member 11a, the control valve 16 and hence the seal part 16a also move forward integrally with the first input member 11a under the urging force of the valve spring 18, and soon the vacuum valve part 16ab of the seal part 16a abuts upon the vacuum valve seat 8a of the valve housing 8. At this time, the rear chamber 7 is disconnected from the front chamber 6 and consequently is also disconnected from the vacuum source of the vehicle.

When the first input member 11a moves further forward, the air valve part 16aa of the seal part 16a is unseated from the air valve seat 11aa of the first input member 11a so that the rear chamber 7 is connected with the atmosphere by way of the air passage 8d and the gap between the air valve part 11aa and the air valve seat 11aa. Accordingly, because an air pressure differential arises between the front chamber 6 and the rear chamber 7 due to the inflow of atmospheric air into the rear chamber 7, the power piston 9 (including the movable wall 5 which has been subjected to a load resulting from this air pressure differential and the valve housing 8 connected to th wall) pushes the output rod 13 forward by way of the reaction disc 12.

As a result of the movable wall 5 being moved forward, the isolating wall 24 abutting against the movable wall 5 with an abutting portion 24a also moves forward. As a result of the forward movement of the isolating wall 24, the auxiliary movable wall 21 is also moved forward. Thus the power piston 9, the isolating wall 24, the auxiliary movable wall 21 and the seal member 25 advance integrally, and the power piston 9 outputs an amplified input to the output rod 13.

When the thrust force of the power piston 9 is outputted to the output rod 13 and the output rod 13 is moved forward, a first output is applied to the first piston 52 of the master cylinder 3 by the output rod 13. This first output advances the first piston 52. As a result of the first piston 52 being thus advanced, the brake fluid inside the first pressure chamber 58 increases in pressure.

As a result of the rise in pressure of the brake fluid inside the first pressure chamber 58, the second piston is advanced, whereupon the brake fluid inside the second pressure chamber increases. As a result of the increase in pressure of the brake fluid inside the two chambers, brake fluid flows out through the actuator part 53 and into the wheel cylinders 54, 55, 56, 57 from an outlet port 3c connected with the first pressure chamber 53 and an outlet port 3d connected with the second pressure chamber. A braking force is thus applied to the wheels FL, FR, RL, RR of the vehicle.

Thereafter, under a reaction force that the input rod 10 receives from the reaction disc 12 by way of the input member 11, the air valve part 16aa of the seal part 16a and the air valve 11aa of the input member 11 or the vacuum valve part 16ab of the seal part 16a and the vacuum valve seat 8a of the valve housing 8 are selectively engaged, and the assisting force of the vacuum booster 2 is controlled according to the input from the driver applied to the input rod 10. A reaction to the thrust force of the power piston 9 and the input generated by the brake pedal being operated and transmitted to the input member 11 are applied to the reaction disc 12 and balanced.

When, as a result of atmospheric air flowing into the rear chamber 7, the inside of the rear chamber 7 reaches atmospheric pressure, the power piston 9 advances no further, and the output of the vacuum booster 2 from then on is effected by the input rod 10 and the input member 11 pushing the output rod 13 forward by way of the reaction disc 12. That is, the input and the output are equal.

When the input member 11 pushes the output rod 13 as described above, because a predetermined clearance is provided between the bottom 13ba of the cup-shaped part 13b of the output rod 13 and the rear face of the inner periphery of the isolating wall 24 facing this bottom 13ba, when the output rod 13 is moved forward it slides forward over an inner circumferential part of the isolating wall 24 on the seal member 23, the inner peripheral part of the isolating wall 24 and the bottom 13ba of the output rod 13 do not abut, and the isolating wall 24 is not moved forward by the output rod 13. Therefore, even when the input member 11 pushes the output rod 13, the isolating wall 24 remains in abutment with the moving wall 5 at the abutting portion 24a.

In this normal operating state, because the solenoid 29k is not operating, the auxiliary variable pressure chamber 26 and the front chamber 6 are connected; there is no pressure differential across the auxiliary moving wall 21, and the auxiliary moving wall 21 is in a non-operating state. The relationship between the brake operation force acting on the input rod 10 and the brake output acting on the output rod 11 and hence the master cylinder 3 at this time is shown in FIG. 4 by the line A.

Now, for example, when during left turning of the vehicle the ECU of the actuator part 53 detects that the vehicle is oversteering, a known operation of brake control for steering (oversteer suppression control) is applied to the front wheel on the outer side of the turn (i.e., the front right wheel FR) from the pump unit of the actuator part 53. This described operation takes place without a braking operation of the driver generating any brake fluid pressure. While this operation of brake control for steering is started in the actuator part 53, power is supplied from the power supply to the solenoid 29k, and the solenoid 29k in turn exerts an electromagnetic force and moves the moving core 29i rearward against the urging force of the springs 291 and 29n.

Because, as a result of movement of the moving core 29i, atmospheric air is introduced into the auxiliary variable pressure chamber 26, an air pressure differential arises across the auxiliary movable wall 21 and the seal member 25 (which is connected to moving wall 21). Consequently, both the auxiliary movable wall 21 and the seal member 25 are moved forward. With this forward movement, the outer annular portion 25aa, the connecting portion 25ac and the inner annular portion 25ab of the bend part 25a of the seal member 25 successively come into contact with the inner circumferential surface of the annular projecting portion 30a of the retainer 30.

As a result of the auxiliary movable wall 21 being moved, the front face of the inner periphery part 21a of the auxiliary movable wall 21 abuts upon the opening rim 52c of the first piston 52, and the first piston 52 is moved forward by the advancing of the auxiliary movable wall 21. Also, the auxiliary movable wall 21 compresses the air passage 28 as it advances.

When the first piston 52 is thus subjected to a load resulting from a second output from the auxiliary movable wall 21 (which moves forward due to a pressure differential between the front chamber 6 and the auxiliary variable pressure chamber 26), the first piston 52 is moved forward. Brake fluid pressurized as a result of such movement is applied from the master cylinder 3 toward the pump unit of the actuator part 53. The pump unit of the actuator part 53 takes in this pressurized brake fluid and delivers the pressurized brake fluid toward the cylinder 55 of the right side front wheel FR. Consequently, a braking force is applied to the right side front wheel FR. In this described example of operation, the wheel cylinders 54, 56, 57 of the vehicle wheels FL, FR, RR do not undergo brake control for steering.

Figure 4:
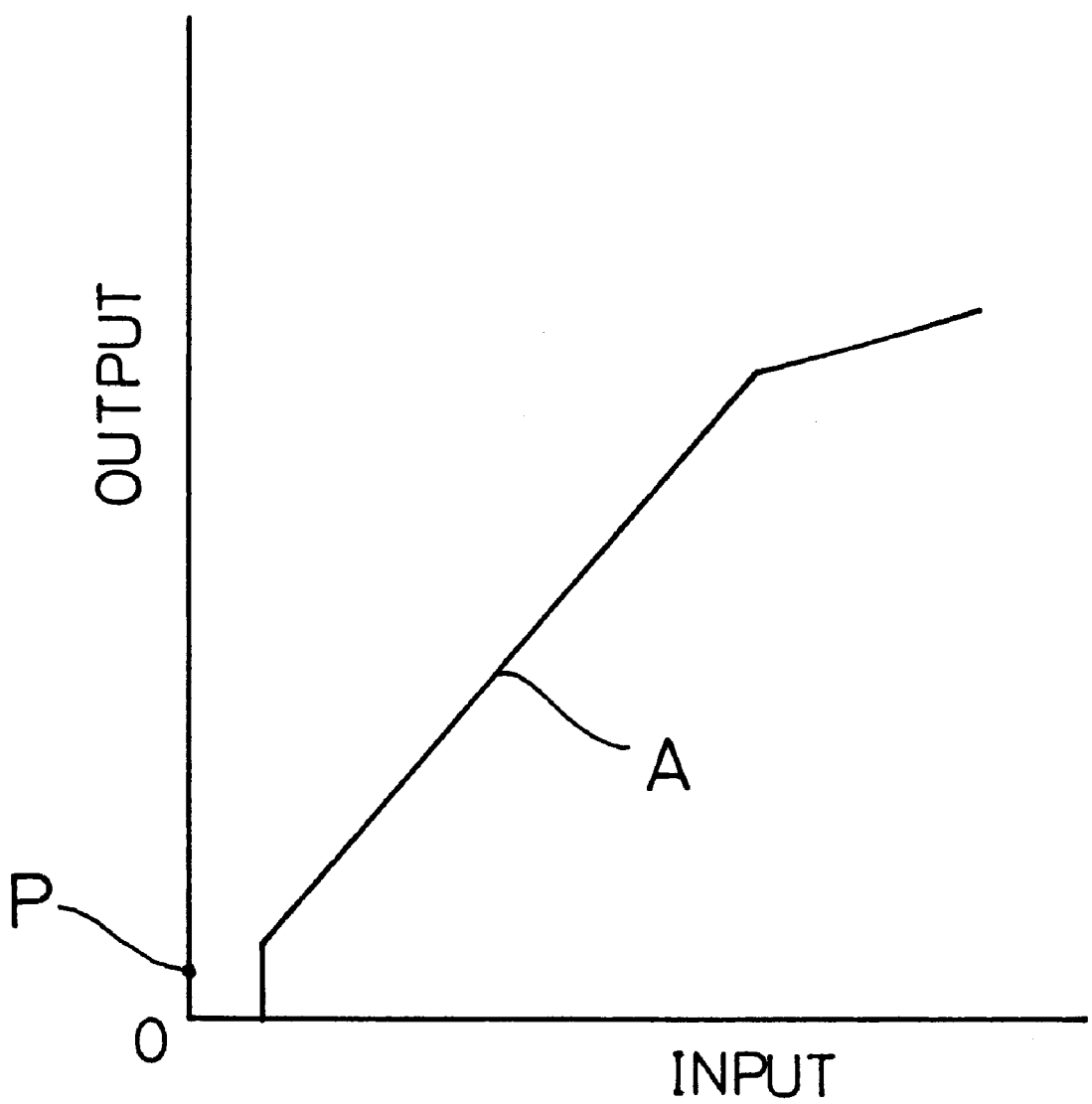
FIG. 4 is a graph showing the input/output characteristics of the hydraulic pressure generator in accordance with the present invention.

The relationship at this time between the input acting on the input rod 10 in the vacuum booster 2 and the output acting on the first piston 52 is shown by the point P in FIG. 4. That is, the vacuum booster 2 and hence the hydraulic pressure generator 1 output an output P for an input of 0 (zero).

The amount of movement of the auxiliary movable wall 21 is preferably determined from the amount of brake fluid necessary for pressurized supply to the brake lines from the pump unit of the actuator part 53 in brake control for steering. Also, in a construction wherein brake control for steering has been added to a brake system having an ABS function and during brake control for steering a pump unit takes in brake fluid from a master cylinder and delivers brake fluid toward a wheel being controlled, it is determined according to the pressure required as a pre-pressurizing function of this pump unit. For example, the movement of the auxiliary movable wall 21 can be on the order of 5–15 mm and the pressurization pressure of brake fluid resulting from the output P is 3–10 kg/cm$^2$. In accordance with the present invention, these necessary pressures can be supplied by suitably setting the size of the diameter of the auxiliary movable wall 21, and the output at the point P in FIG. 4 is an output value appropriate for the pre-pressurizing function with respect to the pump operation of brake control for steering.

Thus, upon the starting of the brake control for steering operation, as a result of the brake fluid, which has been pressurized by the operation of the auxiliary movable wall 21 pushing the first piston 52, being taken into the pump unit of the actuator part 53 from the master cylinder 3, the intaking and delivery operation of the pump unit can be made smoother. Hence, it is possible for the brake fluid pressure of the front wheel on the outer side of the turn to be increased smoothly. Also, because the fluid pressures applied to the non-controlled wheels FL, RL, RR are relatively slight, they do not constitute any hindrance to brake control for steering.

As a result of the operation of steering brake control, oversteering of the vehicle can be advantageously avoided. At the time of this operation of brake control for steering, the operation of the auxiliary movable wall 21 pushing the first piston 52 constitutes a pre-pressurizing function in the brake control for steering operation.

When a microcomputer of the actuator part 53 detects that brake control for steering should end, the supply of power from the power supply to the solenoid 29k is stopped and the solenoid 29k ceases to exert an electromagnetic force on the moving core 29i. Consequently, the moving core 29i is returned forward due to the urging force of the spring 29l by way of the rod part 29j. Also, the valve part 29g is urged forward by the urging force of the spring 29n and the valve 29f moves away from the fixed pressure valve seat 29d and abuts against the atmospheric air valve seat 29e.

As a result of the forward movement of the moving core 29i and the valve part 29g, the auxiliary variable pressure chamber 26 is cut off from the atmosphere and reconnected with the front chamber 6, and the auxiliary moving wall 21 and the seal member 25 (through the auxiliary movable wall 21) are pushed back by the return spring 31. This ends the pre-pressurizing operation of hydraulic pressure generator 1.

As another example, when during brake control for steering, the brake pedal 80 is operated by the driver, the input rod 10 receives this input and moves forward. Consequently, the first input member 11a and the second input member 11b fixed to the input rod 10 also move forward integrally with the input rod 10. As a result of the movement of the first input member 11a, the control valve 16 and hence the seal part 16a also move forward together with the input member 11 under the urging force of the valve spring 18, and soon the vacuum valve part 16ab of the seal part 16a abuts upon the vacuum valve seat 8a of the valve housing 8, with the rear chamber being cut off from the front chamber 6 and thereby also being cut off from the vehicle vacuum source.

When the input member 11 moves further forward, the air valve part 16aa of the seal part 16a unseats from the air valve seat 11aa of the first input member 11a and the rear chamber 7 is thereby connected with the atmosphere. Consequently, atmospheric air flows into the rear chamber 7 and an air pressure differential arises between the front chamber 6 and the rear chamber 7. The movable wall 5 subjected to a load resulting from this air pressure differential together with the valve housing 8 (i.e. the power piston 9), push the output rod 13 forward by way of the reaction disc 12 and push the isolating wall 24 forward by way of the abutting portion 24b.

Because steering brake control is in progress in this example, the bottom of the hollow portion 52a of the first piston 52 has moved forward by a predetermined amount with respect to the front end of the shaft part 13a of the output rod 13. Therefore, in the initial stage of movement of the power piston 9 and the output rod 13, the front end of the shaft part 13a of the output rod 13 does not abut upon the bottom of the hollow portion 52a of the first piston 52. Rather, the front end of the shaft part 13a of the output rod 13 abuts upon the bottom of the hollow portion 52a of the first piston 52 when the power piston 9 and the output rod 13 have advanced by a predetermined amount with respect to the housing 4. When the first piston 52 and the output rod 13 come into abutment, the braking operation of the vacuum booster 2 described above is resumed.

As described above, in the first preferred embodiment of the present invention, the hydraulic pressure generator 1 uses as a first moving means for moving the piston 52 a vacuum booster 2 having a brake pedal 80 and an output rod 13 for applying a first output to the piston 52, and utilizes a pressure differential between the front chamber 6 and the rear chamber 7 to boost the input applied to the brake pedal 80. The hydraulic pressure generator uses, as a second moving means, or auxiliary output applying means, for moving the piston 52 a differential pressure mechanism disposed inside the vacuum booster 2, which utilizes a pressure differential between the front chamber 6 and the auxiliary variable pressure chamber 26 to apply a second output to the piston 52 (using the auxiliary movable wall 21, the front chamber 6, the auxiliary variable pressure chamber 26 and the electromagnetic valve unit 29). Thus, by virtue of the present invention, a construction is realized in which a normal braking output is generated in the output rod 13 and an output for pre-pressurization is generated in the auxiliary movable wall. That is, because the piston 52 is made to operate through the auxiliary movable wall 21 being caused to move, a pre-pressurizing function for pump operation of brake control for steering can be carried out.

Thus, the present invention can be applied as a pre-pressurization function in a brake fluid pressure control apparatus having brake control for steering or the like. The present invention makes it possible to provide a hydraulic pressure generator 1 which makes control, such as brake control for steering, more effective. Also, because the inner peripheral part 21a of the auxiliary movable wall 21 slides on the outer circumferential surface of the shaft part 13a of the output rod 13, stable movement of the auxiliary movable wall 21 in the front-rear direction is possible. Additionally, because in a construction wherein a power piston 9 is urged rearward by way of an isolating wall 24 by a return spring 27, and where the isolating wall 24 has an abutting portion 24a that is adapted to abut upon the power piston 9, the isolating wall 24 can receive the urging force from the return spring 27 in a stable manner.

Because a second vacuum passage 70 is provided between the isolating wall 24 and the power piston 9, and the isolating wall 24 has a connecting passage 24b, even when the isolating wall 24 abuts upon the power piston 9, the connection of the first vacuum passage 3c with the front chamber 6 is made certain by the second vacuum passage 70 and the connecting passage 24b.

Additionally, because the seal member 25 has a bend part 25a, when the pressure differential occurs between the auxiliary variable pressure chamber 26 and the front chamber 6, smooth forward movement of the seal member 25 and hence the auxiliary movable wall 21 is possible. By shortening the air passage 28 in the front-rear direction as the auxiliary movable wall 21 advances, the movement of the auxiliary movable wall 21 can be made smoother. Moreover, the isolating wall 24 does not follow the movement of the output rod 13 accompanying the pushing of the input member 11 and the isolating wall 24 remains in abutment with the power piston 9 and can stably receive the urging force from the return spring 27.

In this preferred embodiment, the vacuum booster is applied in a brake fluid pressure circuit having brake control for steering, but of course the present invention is not limited in that sense. The invention can be applied in any brake fluid pressure circuit requiring a pre-pressurization function. For example, when the invention is practiced in a brake fluid pressure apparatus having a traction control system which when a vehicle begins to move, for example, and an excessive driving force acts on the vehicle wheels so that the driving wheels slip on the road surface, such a traction control system applies a controlled braking force to the slipping driving wheels by driving a pump device without the driver performing a braking operation. This allows the tires of the slipping wheels to grip the road surface by temporarily increasing the brake fluid pressure to the slipping wheels which causes the vehicle to accelerate more effectively. In such a system, this embodiment of the present invention allows brake fluid to be supplied to apply a braking force to the slipping driving wheels more smoothly.

Although in this preferred embodiment the operation of the auxiliary moving wall 21 accompanying operation of the electromagnetic valve unit 29 is used as a pre-pressurizing function in the context of brake control for steering, it is not particularly limited to this construction. For example, it can also be used as an automatic braking function for making the hydraulic pressure generator 1 exert an output greater than a normal output by power being supplied from the power supply to the solenoid 29k independently of any braking operation of the driver when the inter-vehicle distance between the vehicle being driven and a vehicle in front of the vehicle being driven has been shortened to less than a predetermined distance. The controller of the vehicle would determine the need for automatic braking by a method such as determining that automatic braking is necessary on the basis of a value detected by an inter-vehicle distance sensor mounted on the front, or in the front portion, of the vehicle.

In the preferred form of the invention described above, the auxiliary variable pressure chamber 26 is formed by the output rod 13, the auxiliary movable wall 21, the seal member 25 and the isolating wall 24, but the present invention is not limited in this context. Similar advantageous effects can also be obtained for example in a vacuum booster having an auxiliary variable pressure chamber formed by an auxiliary movable wall and a diaphragm as an isolating member connected in an airtight manner to the auxiliary moving wall, or a hydraulic pressure generator according having an auxiliary variable pressure chamber enclosed only by a diaphragm as an isolating member at the rear of an auxiliary movable wall.

Additionally, in the preferred embodiment described above, the electromagnetic valve unit 29 is connected with the vacuum source by way of the front chamber 6, but the invention is not limited in this way. Similar advantageous results can also be obtained, for example, in a hydraulic pressure generator in which an electromagnetic valve unit is directly connected with a vacuum source.

The vacuum booster 2 described above is of a single type construction, but the invention is also applicable to a hydraulic pressure generator using a tandem type vacuum booster.

Even though according to the preferred embodiment of the present intention as described above, the means for operating the piston is divided into the first moving means and second moving means, for example in a brake fluid pressure apparatus of a vehicle having vehicle brake control for steering or the like, it is also possible to use the first moving means for normal braking and use the second moving means for pre-pressurization. Because the means for pre-pressurization operates the piston of the master cylinder, the pressure generator can be simple in structure.

Thus the invention can be applied as a pre-pressurizing function in a brake fluid pressure control apparatus having brake control for steering or the like, and it is possible to provide a pressure generator which makes brake control for steering and the like more effective.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A pressure generator comprising:

a master cylinder having a cylinder body possessing a cylinder bore and a piston located within the cylinder bore and forming a pressure chamber in front of the piston;

a booster having an input member for receiving an input and an output member directly abuttible upon the piston, for boosting an input applied to the input member and applying a first output to the piston through abutment of the output member upon the piston; and auxiliary output applying means for directly engaging the piston and applying a second output to the piston.

2. A pressure generator comprising:

a housing forming inside it at least one pressure chamber;

a power piston disposed inside the housing for advancing and retreating movement with respect to the housing and having a moving wall which divides the pressure chamber into a front chamber connected to a vacuum source and a rear chamber selectively connected to the vacuum source or the atmosphere, and a valve housing attached to the moving wall;

an input member disposed inside the valve housing for advancing and retreating movement with respect to the valve housing and movable by a brake operation;

a valve mechanism disposed inside the valve housing and having a vacuum valve for connecting the rear chamber with the front chamber in correspondence with movement of the input member and an atmospheric air valve for connecting the rear chamber with the atmosphere in correspondence with movement of the input member;

a cylinder body having a cylinder bore and mounted in a front part of the housing;

an output member outputting to outside the pressure generator a thrust force of the valve housing accompanying movement of the moving wall, said output member having a shaft part extending toward the cylinder body;

a piston located in the cylinder bore and forming in front of the piston a pressure chamber, said piston being engagable by the output member;

an auxiliary moving wall disposed inside the front chamber for advancing and retreating movement, said auxiliary moving wall being slidably disposed on the shaft part of the output member and being engagable with the piston;

an isolating member forming an auxiliary variable pressure chamber behind the auxiliary moving wall that is isolated from at least the rear chamber; and switching means for selectively connecting the auxiliary variable pressure chamber with the vacuum source or the atmosphere.

3. A pressure generator according to claim 2, wherein the piston has a concavity opening rearward, the shaft part of the output member being inserted into the concavity of the piston and the shaft part having a front end that is adapted to abut upon a bottom part of the concavity, the auxiliary moving wall having an abutting part that is adapted to abut upon a rim of the opening of the concavity of the piston.

4. A pressure generator according to claim 3, wherein the auxiliary moving wall and the isolating member are connected in an airtight manner by a seal member having a bend part located between an inner periphery and an outer periphery of the seal member.

5. A pressure generator according to claim 1, wherein the auxiliary output applying means includes an auxiliary moving wall forming a part of an auxiliary variable pressure chamber, said auxiliary moving wall being directly engagable with the piston to apply the second output to the piston.

6. A pressure generator according to claim 5, wherein the auxiliary output applying means includes an isolating member forming a part of the auxiliary variable pressure chamber.

7. A pressure generator according to claim 6, wherein the booster includes a housing in which is positioned a movable wall defining a front pressure chamber and a rear pressure chamber, said auxiliary moving wall being located in said front chamber.

8. A pressure generator according to claim 5, wherein the booster includes a housing in which is positioned a movable wall defining a front pressure chamber and a rear pressure chamber, said auxiliary moving wall being located in said front chamber.

9. A pressure generator according to claim 1, wherein the booster includes a housing in which is positioned a movable wall defining a front pressure chamber and a rear pressure chamber, said master cylinder being located in a front portion of the housing.

10. A pressure generator according to claim 2, wherein the auxiliary moving wall is movable along the shaft part between one position in which the auxiliary moving wall is spaced from the piston and a second position in which the auxiliary moving wall is in engagement with the piston.

11. A pressure generator comprising:

a booster housing in which is provided at least one pressure chamber;

a valve housing disposed in the housing;

a moving wall attached to the valve housing and dividing the pressure chamber into a front chamber connected to a vacuum source and a rear chamber selectively connected to the vacuum source or the atmosphere;

an input member disposed inside the valve housing for advancing and retreating movement with respect to the valve housing;

a valve mechanism disposed inside the valve housing to produce a pressure differential between the rear chamber and the front chamber based on movement of the input member, with said pressure differential causing movement of the moving wall and the valve housing;

a cylinder body mounted at a front part of the housing and having a cylinder bore;

a piston located in the cylinder bore and forming a pressure chamber in front of the piston;

an output member which directly engages the piston in the cylinder bore to apply a first output to the piston based on the pressure differential between the front and rear chambers;

an auxiliary moving wall disposed inside the front chamber for advancing and retreating movement, said auxiliary moving wall being movable to engage the piston;

an isolating member forming, with the auxiliary moving wall, an auxiliary variable pressure chamber; and means for producing a pressure differential between the front chamber and the auxiliary variable pressure chamber to move the auxiliary moving wall and cause the auxiliary moving wall to engage the piston and apply a second output to the piston.

12. A pressure generator according to claim 11 wherein the piston has a rearward facing recess in which is positioned a part of the output member, the auxiliary moving wall having an abutting part that is adapted to abut upon an end portion of the piston.

13. A pressure generator according to claim 11, wherein the auxiliary moving wall and the isolating member are connected in an airtight manner by a seal member having a bend part located between an inner periphery and an outer periphery of the seal member.

14. A pressure generator according to claim 11, wherein the auxiliary moving wall is movable along a portion of the output member art between one position in which the auxiliary moving wall is spaced from the piston and a second position in which the auxiliary moving wall is in engagement with the piston.

* * * * *